(12) United States Patent
Riocreux et al.

(10) Patent No.: US 8,452,907 B2
(45) Date of Patent: *May 28, 2013

(54) DATA PROCESSING APPARATUS AND METHOD FOR ARBITRATING ACCESS TO A SHARED RESOURCE

(75) Inventors: Peter Andrew Riocreux, Cheadle (GB); Graeme Leslie Ingram, Royston (GB)

(73) Assignee: ARM Limited, Cambridge (GB)

( * ) Notice: Subject to any disclaimer, the term of this patent is extended or adjusted under 35 U.S.C. 154(b) by 812 days.

This patent is subject to a terminal disclaimer.

(21) Appl. No.: 12/585,853

(22) Filed: Sep. 25, 2009

(65) Prior Publication Data

US 2010/0088443 A1 Apr. 8, 2010

Related U.S. Application Data

(63) Continuation-in-part of application No. 11/727,647, filed on Mar. 27, 2007, now Pat. No. 7,664,901.

(51) Int. Cl.
*G06F 12/00* (2006.01)
(52) U.S. Cl.
USPC ............ 710/244; 710/240; 710/200; 710/260
(58) Field of Classification Search
USPC .......................... 710/240–244, 200, 260–269
See application file for complete search history.

(56) References Cited

U.S. PATENT DOCUMENTS

| | | | |
|---|---|---|---|
| 5,193,197 A * | 3/1993 | Thacker | 710/123 |
| 5,832,278 A | 11/1998 | Pham | |
| 7,698,486 B1 * | 4/2010 | Chowdhuri | 710/116 |
| 2004/0210695 A1 | 10/2004 | Weber et al. | |
| 2004/0243752 A1 * | 12/2004 | O'Connor et al. | 710/243 |
| 2008/0235423 A1 | 9/2008 | Mace | |

OTHER PUBLICATIONS

U.S. Appl. No. 11/727,647, naming Peter Andrew Riocreux et al. as inventors, filed Mar. 27, 2007.

* cited by examiner

*Primary Examiner* — Brian Misiura
*Assistant Examiner* — Kim Huynh
(74) *Attorney, Agent, or Firm* — Nixon & Vanderhye P.C.

(57) ABSTRACT

A data processing apparatus and method are provided for arbitrating access to a shared resource. The data processing apparatus includes a plurality of requester elements sharing access to the shared resource, and arbitration circuitry which is responsive to requests asserted by one or more of the requester elements for access to the shared resource, to perform a priority determination operation to select one of the asserted requests as a winning request. Each of the asserted requests has a priority level associated therewith, and the apparatus further comprises relative priority ordering circuitry for attributing relative priorities to the plurality of requester elements. The arbitration circuitry is responsive to the asserted requests to perform the priority determination operation in order to select as the winning request the request asserted by the requester element with the highest relative priority whose asserted request has a priority level not exceeded by any other asserted request. This provides a very flexible mechanism for performing arbitration, while allowing priority levels to be set on a request-by-request basis, thereby facilitating use of the arbitration circuitry with various quality of service mechanisms.

23 Claims, 6 Drawing Sheets

| | Current LRG list (LRG ↔ MRG) | Highest Active Priority | Group of Masters using Highest Active Priority | LRG from Group | Updated LRG list |
|---|---|---|---|---|---|
| 1st iteration<br>M0 req asserted - P=3<br>M1 req asserted - P=3<br>M2 req asserted - P=1 | M1, M2, M0 | 3 | M0 + M1 | M1 | M2, M0, M1 |
| 2nd iteration<br>M0 req asserted - P=3<br>M1 req asserted - P=3<br>M2 req asserted - P=1 | M2, M0, M1 | 3 | M0 + M1 | M0 | M2, M1, M0 |
| 3rd iteration<br>M0 req asserted - P=0<br>M1 req asserted - P=3<br>M2 req asserted - P=1 | M2, M1, M0 | 3 | M1 | M1 | M2, M0, M1 |
| 4th iteration<br>M0 req asserted - P=0<br>M1 req asserted - P=1<br>M2 req asserted - P=1 | M2, M0, M1 | 1 | M1 + M2 | M2 | M0, M1, M2 |
| 5th iteration<br>M0 req asserted - P=0<br>M1 req asserted - P=1<br>M2 req asserted - P=5 | M0, M1, M2 | 5 | M2 | M2 | M0, M1, M2 |

FIG. 6

DATA PROCESSING APPARATUS AND METHOD FOR ARBITRATING ACCESS TO A SHARED RESOURCE

CONTINUATION-IN-PART

This application is being filed as a continuation-in-part of commonly owned, U.S. application Ser. No. 11/727,647 file Mar. 27, 2007, now U.S. Pat. No. 7,664,901, the entire contents of which are hereby incorporated by reference.

BACKGROUND OF THE INVENTION

1. Field of the Invention

The present invention relates to a data processing apparatus and method for arbitrating access to a shared resource.

2. Description of the Prior Art

Within a data processing apparatus, it is known to provide one or more resources which are shared amongst a plurality of elements of the data processing apparatus. For example, the plurality of elements may take the form of a plurality of master devices, and the shared resource may take the form of a slave device with respect to which the various master devices can initiate transactions. Each transaction typically consists of an address transfer from a master device to a slave device, and one or more data transfers between the master device and the slave device. For a write transaction, these data transfers will pass from the master device to the slave device (in some implementations there will additionally be a write response transfer from the slave device to the master device), whilst for a read transaction these data transfers will pass from the slave device to the master device.

To enable each transaction to take place, a communication path needs to be established between the master device initiating the transaction, and the slave device to which the transaction is directed. If the slave device is shared amongst a plurality of master devices, then this can cause contention amongst the various master devices for access to the shared slave device, and this contention can occur at a variety of points within the data processing apparatus.

For example, dependent on the mechanism provided for establishing the communication paths, it may be possible to provide separate dedicated communication paths for each master device. However, since the slave device will typically only be able to handle one transaction at a time, this leads to contention at the input to the slave device itself, and typically it is then necessary to provide arbitration circuitry to arbitrate between multiple simultaneous access requests issued by different master devices and seeking to access the same shared slave device.

More typically, the mechanism used to establish the communication paths between master devices and slave devices is also shared amongst the various master and slave devices. Accordingly there will typically be points along the communication paths between a master device and a slave device which involve use of a shared physical connection medium, and accordingly arbitration is typically required at such points along the communication paths.

For example, a data processing apparatus may provide interconnect circuitry for coupling the various master devices and slave devices, with the interconnect circuitry providing a plurality of connection paths over which such communication paths can be established. Often, certain of the connection paths are shared between multiple devices, and accordingly arbitration circuitry is provided to arbitrate access to such connection paths. In such instances, it can be seen that the connection paths themselves form a shared resource.

In addition to there being various types of shared resource, there may also be various types of requester elements seeking access to the shared resource. Whilst a master device is one example of such a requester element, a requester element may more generally take the form of a master interface, which may be provided directly by a master device, or may instead be provided by some intermediate structure between a master device and the shared resource. Hence, by way of example, the master interface may be provided by interconnect circuitry connecting one or more master devices with one or more slave devices.

Hence, it will be appreciated that within a typical data processing apparatus, there will be a variety of shared resources and requester elements, and wherever multiple requester elements are contending for access to that shared resource, arbitration circuitry is typically provided to arbitrate amongst those requester elements so as to decide at any point in time which requester element should have access to that shared resource.

Typically, the arbitration circuitry will be configured to apply a particular arbitration policy to decide which requester element to grant access to the shared resource at any particular point in time. For example, a known arbitration scheme may use an algorithm that employs a fixed priority technique, whereby particular priority levels are associated with particular requester elements, and then when multiple requester elements are seeking to access a shared resource at the same time, the arbitration circuitry grants access to the requester element having the highest priority. An alternative known arbitration policy applies a round robin (fair share) technique, which may for example be appropriate when all of the various requester elements that may access the shared resource are considered to have equal priority, and the aim is to seek to provide each requester element with the same level of access to the shared resource.

However, the above techniques lack flexibility. To improve flexibility, commonly owned, co-pending U.S. application Ser. No. 11/727,647, the entire contents of which are hereby incorporated by reference, describes a mechanism whereby arbitration circuitry is arranged to apply an arbitration policy that comprises multiple priority groups, with each group having a different priority. Each of the requester elements is allocated to one of those priority groups such that each priority group contains at least one of the requester elements. Within each priority group the arbitration circuitry then applies a priority ordering operation to attribute relative priorities to the requester elements within that priority group. Responsive to a predetermined event, the arbitration circuitry then re-applies the priority ordering operation within at least one priority group prior to a subsequent performance of a priority determination operation used to select a winning request from the requests currently seeking access to the shared resource.

In performing the priority determination operation, the arbitration circuitry selects as the winning request the request having the highest priority. From the above-described arbitration policy, it will be appreciated that a particular request's priority will be dependent on which priority group the requester element issuing that request is associated with, and also will depend on the relative priorities attributed to the requester elements within that particular priority group. Since the priority ordering operation that determines the relative priorities within a priority group is re-applied upon occurrence of a predetermined event, the relative priorities of the requester elements within a particular priority group will vary over time (assuming that priority group contains more than one requester element).

Such an approach provides a great deal of flexibility as to the type of arbitration scheme employed by the arbitration circuitry. This flexibility is possible due to the two tier approach to prioritization, where different priorities are associated with each priority group, and then relative priorities are attributed to the requester elements within any particular priority group, with those relative priorities being recalculated following predetermined events. In one described embodiment, the predetermined event is the occurrence of the priority determination operation itself, and accordingly in such embodiments each time the arbitration circuitry selects a winning request, the priority ordering operation is re-applied, which dependent on the number of requester elements within the priority group, and the form of the priority ordering operation applied, may cause the relative priorities to change on each iteration of the priority determination operation. However, the priorities of the priority groups themselves are not changed by re-application of the priority ordering operation.

However, in accordance with the technique described in U.S. application Ser. No. 11/727,647, it is necessary to allocate each requester element to a priority group, and hence the technique operates on the assumption that all transactions issued by a particular requester element will have the same priority. However, as more and more development takes place in the area of quality of service (QoS), there is becoming a need for priority levels to be associated with individual transactions, rather than with the requester element issuing the transactions. Accordingly, it would be desirable to develop a technique which enabled a flexible priority mechanism to be employed, whilst also enabling priority levels to be set independently for transactions, rather than associating priority levels with the individual requester elements.

SUMMARY OF THE INVENTION

Viewed from a first aspect, the present invention provides a data processing apparatus comprising: a shared resource; a plurality of requester elements sharing access to the shared resource; arbitration circuitry, responsive to requests asserted by one or more of said requester elements for access to the shared resource, to perform a priority determination operation to select one of said asserted requests as a winning request, each of the asserted requests having a priority level associated therewith; relative priority ordering circuitry for attributing relative priorities to the plurality of requester elements; the arbitration circuitry being responsive to the asserted requests to perform the priority determination operation in order to select as said winning request the request asserted by the requester element with the highest relative priority whose asserted request has a priority level not exceeded by any other asserted request.

In accordance with the present invention, each of the asserted requests has a priority level associated therewith, and relative priority ordering circuitry is provided for attributing relative priorities to the plurality of requester elements. The arbitration circuitry then employs a priority determination operation in order to select the winning request, taking into account both the priority level associated with each asserted request, and the relative priorities of the requester elements asserting those requests. By taking both factors into account, the arbitration circuitry can ensure that the winning request is that request with the highest priority level among all of the asserted requests, and in the event that there is more than one request asserted with that highest priority level, that the relative priorities of the associated requester elements are taken into account when deciding the winning request.

The technique of the present invention hence provides a very flexible mechanism for arbitrating between multiple asserted requests, by taking into account not only the priority level associated with the individual requests but also the relative priorities of the requester elements issuing those requests. Further, the technique of the present invention permits a dynamic priority mechanism to be used, since the priority level associated with requests from particular requester elements need not be fixed, and instead the priority level can be set on a request-by-request basis. This hence enables QoS mechanisms setting priority levels on a transaction-by-transaction basis to be used within an apparatus incorporating the arbitration circuitry of the present invention. Hence, embodiments of the present invention allow the benefits of the technique in the earlier described, co-pending, U.S. application Ser. No. 11/727,647 to be achieved, whilst also permitting the dynamic variation of the priority of the requester, by allowing the priority level to be set on a per-request, rather than a per-requester element, basis.

The arbitration circuitry can take a variety of forms. However, in one embodiment the arbitration circuitry comprises: candidate winner evaluating circuitry for identifying every requester element whose asserted request has a priority level not exceeded by any other asserted request; and winner selection circuitry for determining the requester element that has the highest relative priority amongst the requester elements identified by the candidate winner evaluating circuitry, and selecting as said winning request the request asserted by that determined requester element.

Hence, the candidate winner evaluating circuitry uses the asserted priority level to identify a subset of the asserted requests from which the winning request should be chosen, and then the winner selection circuitry employs the relative priority information maintained by the relative priority ordering circuitry in order to select the winning request from that subset. It will be appreciated that in instances where one of the asserted requests has a priority level higher than any of the other asserted requests, the subset identified by the candidate winner evaluating circuitry will only have one request in it, but more generally the number of requester elements identified by the candidate winner evaluating circuitry can vary from one to the total number of requests being asserted.

The manner in which the candidate winner evaluating circuitry operates can take a variety of forms. However, in one embodiment, the candidate winner evaluating circuitry is arranged to identify a highest priority level associated with the asserted requests, and to determine a requester group containing every requester element from the plurality of requester elements whose asserted request has said highest priority level associated therewith. In this embodiment, the requester group forms the subset referred to earlier.

In such embodiments, the winner selection circuitry may be arranged to determine with reference to the relative priority ordering circuitry which requester element in the determined requester group has the highest relative priority, and to select as the winning request the request asserted by that determined requester element.

In one embodiment, the relative priorities attributed by the relative priority ordering circuitry are predetermined. Even when the relative priorities are predetermined, the mechanism of embodiments of the present invention still provides flexibility in arbitration, since it allows the priority levels of the requests issued by the various requester elements to be set on a request-by-request basis, and hence allows the arbitration circuitry to operate in combination with QoS mechanisms to provide desired levels of service to individual requester elements.

In an alternative embodiment, the relative priority ordering circuitry is arranged to apply a relative priority ordering operation to attribute the relative priorities to the plurality of requester elements. Hence, the relative priorities can be varied during use, thereby further improving flexibility of the arbitration mechanism employed by the arbitration circuitry.

In one embodiment, the relative priority ordering circuitry is responsive to a predetermined event to re-apply the relative priority ordering operation prior to a subsequent performance of the priority determination operation by the arbitration circuitry. This hence enables the relative priorities to be varied over time. The predetermined event which causes the relative priorities to be recalculated through re-application of the relative priority ordering operation can take a variety of forms.

However, in one embodiment the predetermined event is a current performance of the priority determination operation, and the relative priority ordering circuitry re-applies the relative priority ordering operation in respect of at least a subset of the requester elements. Typically, the subset will include the requester element associated with the winning request selected by that current performance of the priority determination operation. Accordingly, in such embodiments, each time the arbitration circuitry selects a winning request, the priority ordering operation is re-applied, which hence enables the relative priorities to be changed on each iteration of the priority determination operation.

Whilst the relative priority ordering operation may be applied only in respect of a subset of the requester elements, in one embodiment the relative priority ordering circuitry re-applies the relative priority ordering operation in respect of all of the requester elements. This simplifies the design of the relative priority ordering circuitry whilst still providing a great deal of flexibility in the arbitration mechanism implemented by the arbitration circuitry. However, if desired, one or more of the requester elements could be excluded from the relative priority ordering operation. For example, if a particular requester element were particularly latency intolerant, it could be arranged to always have the highest relative priority and hence be excluded from the relative priority ordering operation (or included but with the relative priority ordering operation being arranged not to change the relative priority of that particular requester element), such that whenever that requester element asserts a request with a priority level not exceeded by any other asserted request, its request will be chosen as the winning request.

The relative priority ordering operation applied by the relative priority ordering circuitry can take a variety of forms. However, in one embodiment where the relative priority ordering operation is re-applied following each performance of the priority determination operation, the relative priority ordering operation may be arranged to implement a least recently granted (LRG) scheme, and the arbitration circuitry determines with reference to the relative priority ordering circuitry which requester element is the least recently granted requester element whose asserted request has a priority level not exceeded by any other asserted request. In such embodiments, the requester element issuing the winning request is relegated to the bottom of the relative priority ordering maintained by the relative priority ordering circuitry.

As an alternative scheme that could be implemented, the relative priority ordering operation could implement a round-robin scheme, such that each time the priority determination operation is performed, then the requester element having the highest relative priority is relegated to the bottom of the relative priority ordering, irrespective of whether it was asserting a request at that time or not. This may for example be appropriate where the requester elements are expected to be issuing requests for a significant proportion of the time.

Irrespective of the actual scheme used for the relative priority ordering operation, in one embodiment the relative priority ordering operation implements a weighted algorithm. This can be used to improve the chance of one or more requester elements issuing winning requests, and hence provides yet further flexibility in the way in which the arbitration is performed.

The weighted algorithm could be implemented in a variety of ways. In one embodiment the relative priority ordering operation maintains a list of entries, each entry being populated to identify one of said plurality of requester elements, and the weighted algorithm being implemented by causing at least one of the requester elements to be identified by more than one entry in said list. By such an approach, it would be possible to implement a weighted round-robin scheme, where a requester element has multiple entries scattered through the list, and hence will be considered to have the highest relative priority more often than other requester elements. Similarly, a weighted LRG scheme could be applied where only one entry at a time is relegated to the bottom of the list, and hence a requester element with more entries is more likely to win against another requester element issuing a transaction with the same priority level.

Arbitration often forms a critical path in modern data processing systems operating at high clock speeds. Whilst in one embodiment the arbitration circuitry of the present invention may be arranged to perform the priority determination operation in order to select a winning request in a single clock cycle, in an alternative embodiment the arbitration circuitry has a pipelined arrangement consisting of at least two pipeline stages. In one embodiment, the arbitration circuitry has two pipeline stages, and hence performs arbitration in two cycles. In one particular embodiment, the arbitration circuitry is arranged to identify in a first cycle the highest priority level amongst the currently asserted requests, and is then arranged in a next clock cycle to perform the remainder of the priority determination operation. In such embodiments, it will typically be the case that the actual payload associated with each asserted request (for example an address and associated control signals for an address transfer request) is registered at the end of the first clock cycle, so that it is kept in step with the two stage arbitration process.

The requester elements can take a variety of forms. In one embodiment, at least one of the requester elements comprises a master device. However, more generally, at least one of the requester elements may comprise a master interface. Whilst that master interface may be provided directly by a master device, in one embodiment the master interface is provided by interconnect circuitry connecting one or more master devices with one or more slave devices.

Similarly, the shared resource can take a variety of forms. In one embodiment, the shared resource is a slave device arranged to process transactions initiated by the asserted requests from one or more of said requester elements. In an alternative embodiment, the shared resource is a shared connection path over which the asserted requests are to be routed.

The asserted requests can take a variety of forms. However, in one embodiment, each asserted request initiates a transaction comprising an address transfer and one or more data transfers. In one such embodiment, each asserted request forms the address transfer.

Viewed from a second aspect, the present invention provides a method of arbitrating access to a shared resource within a data processing apparatus comprising a plurality of requester elements sharing access to said shared resource, the method comprising the steps of: responsive to requests asserted by one or more of said requester elements for access to the shared resource, performing a priority determination operation to select one of said asserted requests as a winning request, each of the asserted requests having a priority level associated therewith; attributing relative priorities to the plurality of requester elements; and during the performance of said priority determination operation, selecting as said winning request the request asserted by the requester element with the highest relative priority whose asserted request has a priority level not exceeded by any other asserted request.

Viewed from a third aspect, the present invention provides a data processing apparatus comprising: shared resource means; a plurality of requester means for sharing access to the shared resource means; arbitration means, responsive to requests asserted by one or more of said requester means for access to the shared resource means, for performing a priority determination operation to select one of said asserted requests as a winning request, each of the asserted requests having a priority level associated therewith; relative priority ordering means for attributing relative priorities to the plurality of requester means; the arbitration means, responsive to the asserted requests, for performing the priority determination operation in order to select as said winning request the request asserted by the requester means with the highest relative priority whose asserted request has a priority level not exceeded by any other asserted request.

BRIEF DESCRIPTION OF THE DRAWINGS

The present invention will be described further, by way of example only, with reference to embodiments thereof as illustrated in the accompanying drawings, in which:

FIG. 6 is a chart illustrating the operation of the arbitration circuitry for a sequence of arbitration operations in accordance with one embodiment.

DESCRIPTION OF EMBODIMENTS

The arbitration circuitry of embodiments of the present invention can be used at any location within a data processing apparatus where a plurality of requester elements are contending for access to a shared resource, for example a shared slave device, a shared connection path, etc. By way of illustration of one particular embodiment of the present invention, a data processing apparatus will be considered having a plurality of master devices coupled via interconnect circuitry with a plurality of slave devices. Interconnect circuitry typically provides a plurality of connection paths for coupling the various master devices and slave devices, and the way in which the various transfers of each transaction are routed via those connection paths will be dependent on the bus protocol employed within the interconnect circuitry.

One known type of bus protocol is the non-split transaction protocol, where there is a fixed timing relationship between the address transfer of a transaction and the subsequent one or more data transfers of that transaction. However, for the purposes of illustrating an embodiment of the present invention, it will be assumed that the interconnect circuitry of the data processing apparatus employs a split transaction protocol in which separate address channels and data channels are provided, and the timing of data transfers is decoupled with respect to the timing of address transfers of a particular transaction. In one particular embodiment, the interconnect circuitry operates in accordance with the AXI (Advanced eXtensible Interface) protocol developed by ARM Limited, Cambridge, United Kingdom, and the connection paths of the interconnect circuitry provide five channels, namely a read address channel, a write address channel, a read data channel, a write data channel and a write response channel.

Figure 1:
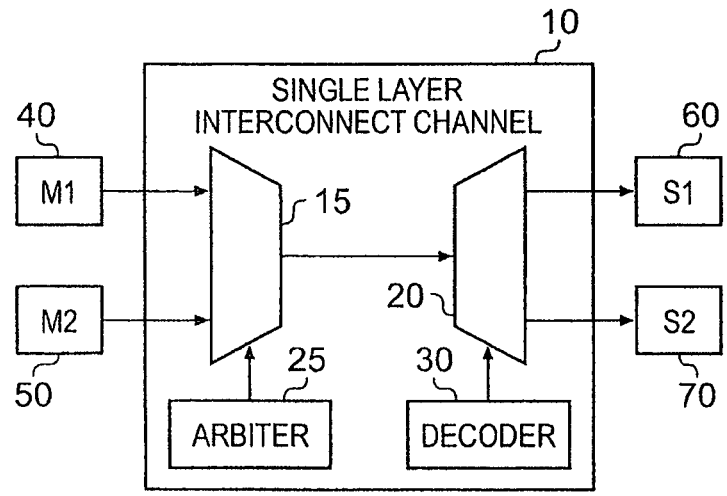
FIG. 1 is a block diagram illustrating a channel of a single layer interconnect structure.

In one embodiment of the present invention, the interconnect circuitry has a single layer interconnect structure. FIG. 1 is a block diagram illustrating schematically the read address channel of such a single layer interconnect. In this example, two master devices 40, 50 and two slave devices 60, 70 are coupled to the channel 10 of the single layer interconnect. Within the channel 10, an arbiter 25 is used to control a multiplexer 15 so as to arbitrate between multiple read address transfers issued by the master devices 40, 50. Similarly, a decoder 30 is provided for controlling the de-multiplexer 20 so as to route any particular read address transfer to the appropriate target slave device 60, 70.

The write address channel and the write data channel are constructed in a similar way to the read address channel illustrated in FIG. 1. The read data channel and write response channel are also constructed similarly, but in these two instances the position of the master devices 40, 50 and slave devices 60, 70 are reversed, since for these two channels the transfers occur from the slave devices to the master devices, and hence the arbitration is performed between slave devices rather than master devices.

Figure 2:
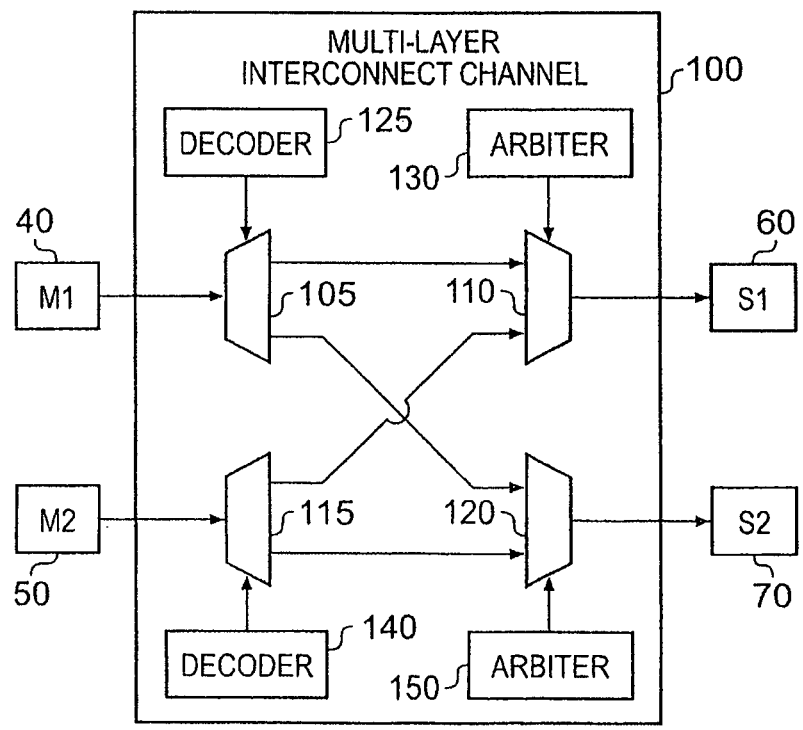
FIG. 2 is a block diagram illustrating a channel of a multi-layer interconnect structure.

In an alternative embodiment of the present invention, the interconnect circuitry has a multi-layer interconnect structure. FIG. 2 schematically illustrates the components provided within a read address channel of such a multi-layer interconnect structure in accordance with one embodiment of the present invention. Again, two master devices 40, 50 and two slave devices 60, 70 are shown connected to the read address channel 100. Decoders 125, 140 are provided in association with each master device 40, 50, for controlling respective de-multiplexers 105, 115 so as to control the routing of the read address transfers through the channel 100 dependent on the target slave device. Further, arbiters 130, 150 are provided in association with each slave device 60, 70 for controlling respective multiplexers 110, 120 so as to arbitrate between multiple read address transfers destined for a particular slave device. As with the FIG. 1 example, the write address channel and write data channel for a multi-layer interconnect structure will be constructed in a similar manner to that shown for the read address channel 100 of FIG. 2. Further, the read data channel and write response channel will also be constructed similarly but with the positions of the master devices 40, 50 and slave devices 60, 70 reversed, and hence the arbiters will be provided in association with each master device rather than each slave device.

It will be appreciated that in a typical data processing apparatus, there will often be more than two master devices and more than two slave devices, and accordingly there will be a corresponding proliferation of paths and associated circuitry within each of the channels. Accordingly the diagrams of FIGS. 1 and 2 should be treated as schematic illustrations rather than diagrams of the actual paths provided in any particular embodiment.

From the above discussions, it will be appreciated that in such embodiments there are likely to be a significant number of locations within each of the channels where arbiters are required to arbitrate between multiple requester elements seeking to access a shared resource. Such arbiters may be directly arbitrating access to a shared device, such as the arbiters 130, 150 which arbitrate access to the shared slave devices 60, 70, respectively, whilst other arbiters may be arbitrating between multiple requester elements seeking to access a shared connection path, such as the arbiter 25 arbitrating between master devices 40, 50 seeking to access the shared connection path through the single layer interconnect channel 10.

Figure 3:
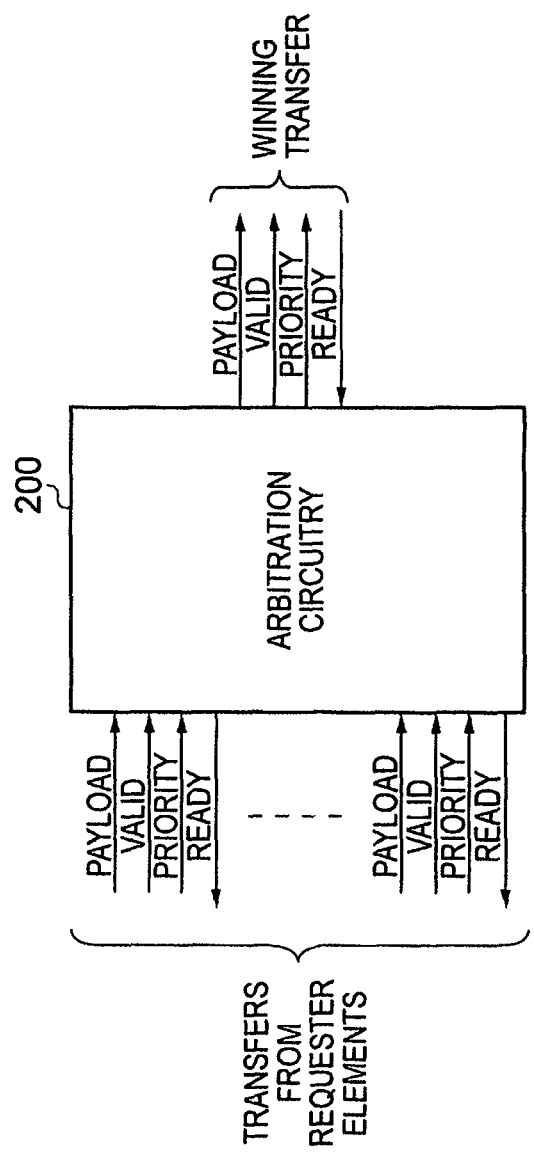
FIG. 3 schematically illustrates arbitration circuitry in accordance with one embodiment.

FIG. 3 schematically illustrates the arbitration circuitry of embodiments of the present invention, that can be used wherever an arbiter is required within a channel to arbitrate between multiple requester elements seeking to access a shared resource. Each transfer from a requester element will provide payload data passing from the requester element to the destination, along with a pair of handshaking signals. In the AXI protocol, these handshaking signals take the form of a valid signal passing over the channel in the same direction as the payload data, and a ready signal passing over the channel in an opposite direction to the payload data and the valid signal, but it will be appreciated that in other protocols different forms of handshaking signals may be used, for example request/acknowledge handshaking signals. For the write address, write data and read address channel, the payload data will be passing in the direction from a master towards a slave, but for the write response and read data channels the payload data will be passing in the direction from a slave towards a master. As shown in FIG. 3, each transfer also includes a priority level signal associated with the payload data to identify the priority level associated with the transfer issued by the corresponding requester element. In one embodiment, the priority level signal may form part of the payload data, but in an alternative embodiment can be provided separately as a sideband signal, for example where the priority level is a fixed value or provided by a programmable value stored in a register. For the purposes of the following description, the priority level signal will be shown as a separate signal to the payload for ease of illustration, since the priority level signal is used by the arbitration circuitry when performing its arbitration operation.

For an address transfer, the payload will typically comprise an address and one or more control signals specifying, for example, whether the address relates to cacheable data, the burst length of the transaction specified by the address transfer, etc. Similarly, for a data transfer, the payload will typically comprise the associated data value(s) along with one or more control signals.

Hence, as illustrated in FIG. 3, the arbitration circuitry 200 will receive, for each requester element coupled to the arbitration circuitry, a transfer consisting of payload and an associated priority level signal, along with valid and ready handshaking signals, and will apply an arbitration operation to decide which of the currently valid transfers should be selected as a winning transfer for outputting from the arbitration circuitry.

Figure 4:
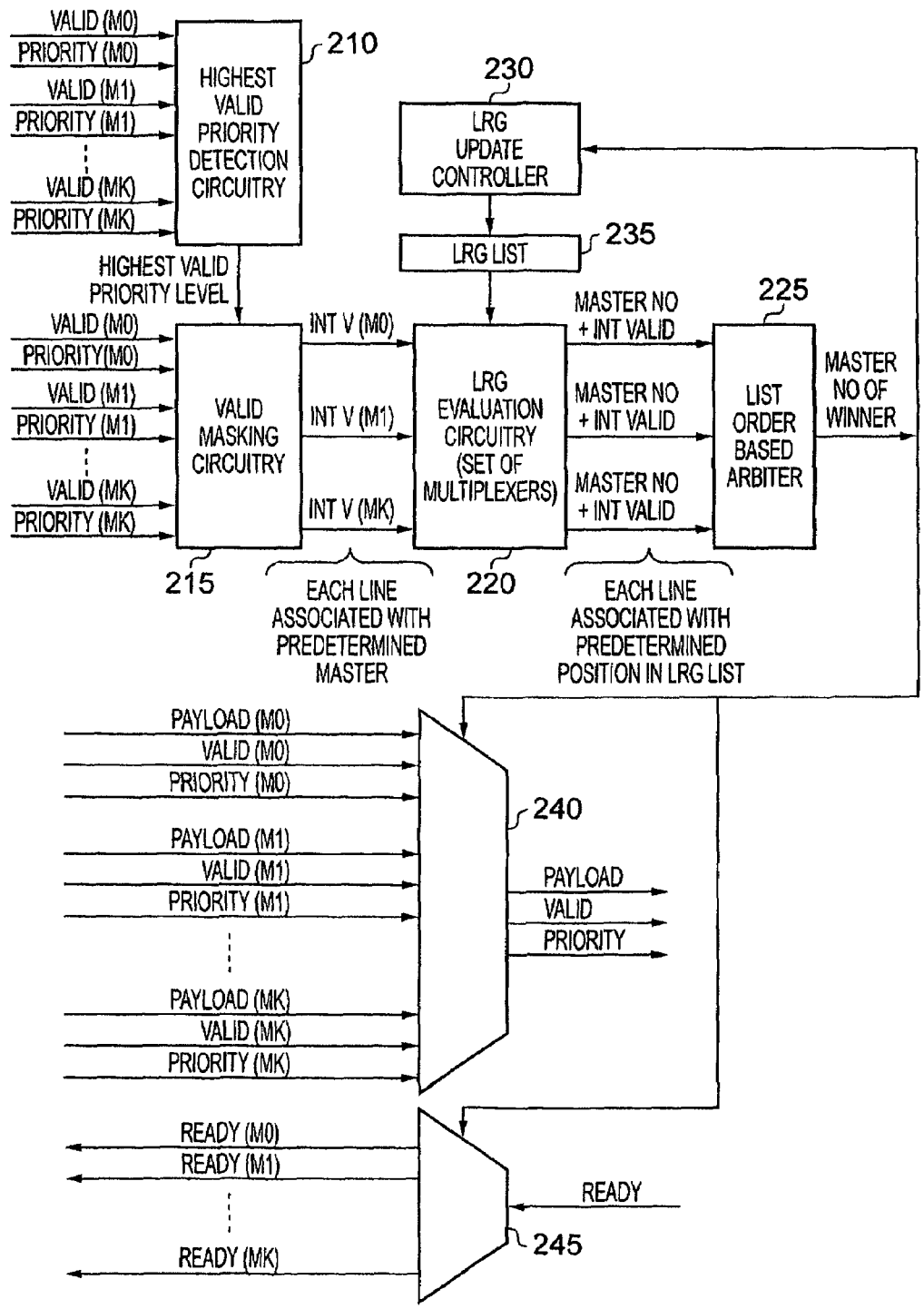
FIG. 4 illustrates in more detail the arbitration circuitry of FIG. 3 in accordance with one embodiment.

FIG. 4 illustrates in more detail the operation of the arbitration circuitry 200 of FIG. 3 in accordance with one embodiment. The arbitration circuitry 200 of FIG. 3 incorporates not only the arbiters discussed earlier with reference to FIGS. 1 and 2, but also their associated multiplexer/de-multiplexer circuitry. Accordingly, as shown in FIG. 4, the arbitration circuitry 200 includes a multiplexer 240 which receives the payload, valid and priority level signals for each requester element connected to the arbitration circuitry (in this example the requester elements being the master devices M0 to Mk). A demultiplexer 245 is also provided for handling the routing of the ready signal returned from the recipient to the requester elements.

The upper portion of FIG. 4 illustrates the components that are provided within the arbitration circuitry in one embodiment in order to determine the winning transfer. In particular, as shown, the valid and priority level signals for each of the requester elements is input to the highest valid priority detection circuitry 210. The circuitry 210 determines the highest priority level associated with a valid transfer currently being asserted by the requester elements, and outputs an indication of that highest valid priority level to the valid masking circuitry 215.

The valid masking circuitry 215 uses the highest valid priority level as a form of mask to qualify the valid signals received from each of the requester elements. In particular, only valid transfers at that highest valid priority level will cause a corresponding internal valid signal output by the valid masking circuitry 215 to be set. The internal valid signal can in one embodiment be a single bit value set to identify that the corresponding transfer is valid and has the highest priority level, with the internal valid signal not being set unless the above condition is met. Alternatively, each internal valid signal can be a one hot signal which has one bit set when the corresponding transfer is valid and asserted at the highest valid priority level, with the particular bit set identifying that highest valid priority level. Any transfer which is not valid, or is valid but not at the highest valid priority level, will have its internal valid signal not set (i.e. all bits of the one hot signal will be cleared).

As illustrated in FIG. 4, each of the output lines from the valid masking circuitry is associated with a predetermined requester element, in this example it being assumed that the requester elements are separate master devices.

The least recently granted (LRG) evaluation circuitry 220 receives the internal valid signals and also receives an LRG list 235 maintained by the LRG update controller 230. The LRG list 235 maintains a relative priority order for all of the requester elements. LRG evaluation circuitry 220 can be constructed as a set of multiplexers to generate for each predetermined position (also referred to herein as a predetermined entry) in the LRG list an indication of the master number currently held at that position and the value of the corresponding internal valid signal for that master. Hence, by way of example, the uppermost output from the LRG evaluation circuitry 220 may identify the least recently granted master and the associated internal valid signal for that master, with the next uppermost output identifying the next least recently granted master and its associated internal valid signal, etc.

The list order based arbiter 225 then merely determines the first output from the LRG evaluation circuitry, starting with the uppermost output, which has a set internal valid signal, and then selects the master identified by that output as having the winning transfer. The master number of the winning transfer is then output as a control signal to the multiplexer 240 and the demultiplexer 245 to cause the payload, valid and priority signals for the winning master to be output from the multiplexer 240, and for the ready signal to be routed via the demultiplexer 245 to the corresponding master.

Hence, purely by way of example, if it is assumed that there are five valid asserted transfers to be arbitrated amongst, with the transfers from master 0 and master 1 having the same priority level, and that priority level being higher than the priority level of any of the other transfers, then the highest valid priority detection circuitry 210 operating in combination with the valid masking circuitry 215 will cause the internal valid signals for masters 0 and 1 to be set, and the internal valid signals for all other masters not to be set. If the LRG list 235 identifies master 1 as being less recently used than master 0, then this will cause the list order based arbiter 225 to select master 1 as the winning request, and for the multiplexer 240 and demultiplexer 245 to be controlled accordingly.

As also shown in FIG. 4, the winning master number is returned to the LRG update controller 230 to cause an update to be performed in respect of the LRG list 235. Preferably, such an update is performed each time the arbitration process takes place, but in other embodiments the update may occur less frequently. The LRG update controller 230 will be responsive to an indication of the winning master number to demote that winning master number to the bottom of the LRG list, thereby reducing the chance that the next transfer asserted by the winning master will again be chosen as the winning request. However, it will be appreciated that the priority level asserted for the transfer is used to perform the initial determination of those asserted transfers that are candidates to be chosen as the winning transfer, and accordingly if that master then asserts a transfer at a higher priority level than any other asserted transfer, it will be chosen as the winning request even though it has been demoted within the LRG list.

Figure 5:
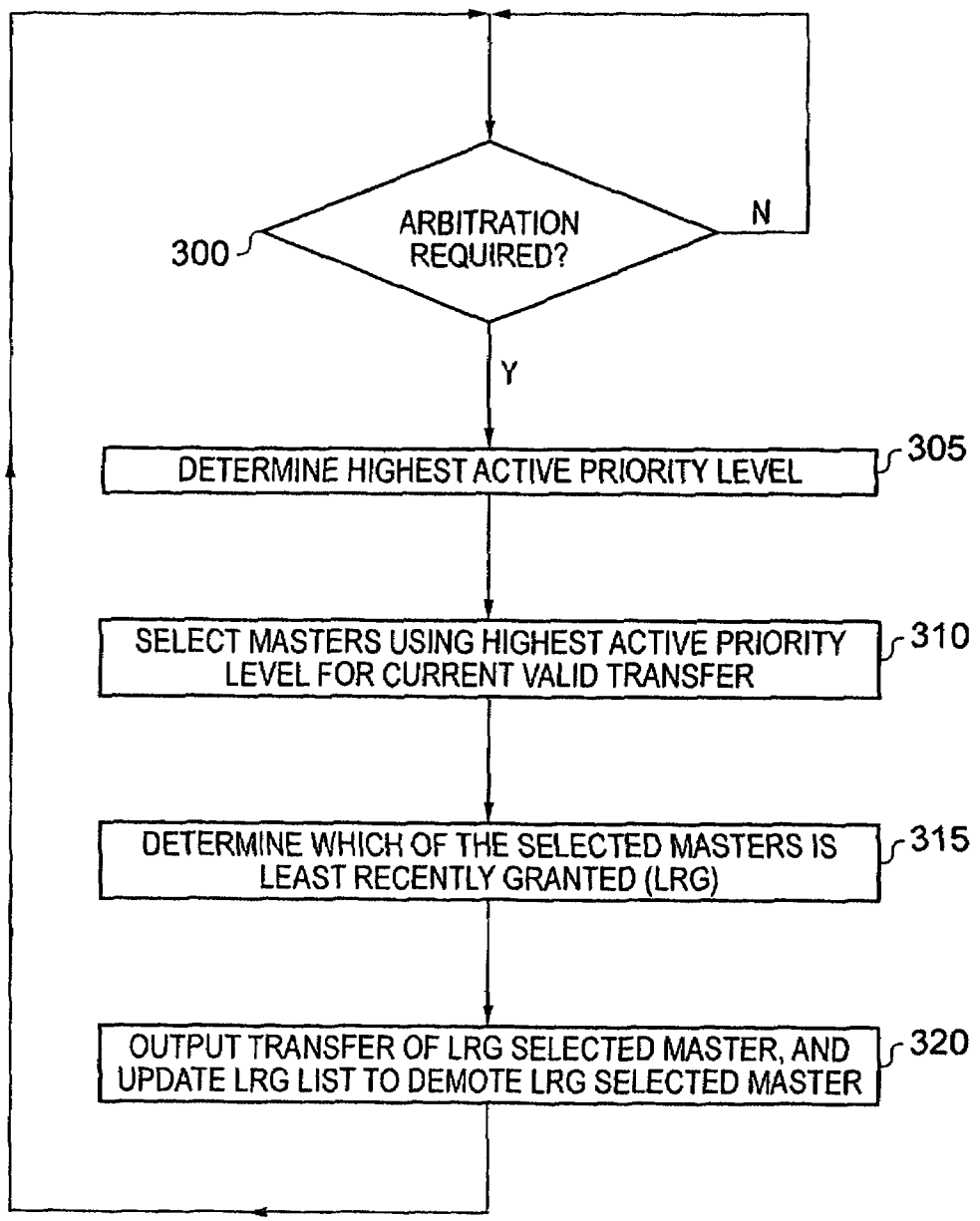
FIG. 5 is a flow diagram illustrating the steps performed by the arbitration circuitry of FIG. 4 in accordance with one embodiment.

FIG. 5 is a flow diagram illustrating the operation of the arbitration circuitry of FIG. 4. At step 300, it is determined whether arbitration is required. In one embodiment, the arbitration process can be performed each clock cycle, but in another embodiment the arbitration process could be arranged to only be triggered in the event that more than one valid transfer is asserted in a particular clock cycle.

Once it is determined that arbitration is required, the highest active priority level is determined at step 305, this process being performed by the highest valid priority detection circuitry 210. Then, at step 310, a candidate list of masters from amongst the masters currently asserting transfers is determined. In particular, the candidate list of masters is formed of those masters that are using the highest active priority level for their current valid transfer. This process is performed by the valid masking circuitry 215 of FIG. 4.

Thereafter, it is determined which of the masters selected at step 310 is the least recently granted, this step being performed by the LRG evaluation circuitry 220 with reference to the LRG list 235.

Thereafter, at step 320, the arbitration circuitry outputs the transfer of the LRG selected master by propagating on the payload, valid and priority signals for that master towards the destination, and also routing the ready signal from the destination back towards the selected master. This step is performed by the list order based arbiter 225 in combination with the multiplexer 240 and demultiplexer 245.

In addition, at step 320, the LRG list is updated in order to demote the LRG selected master, this step being performed by the LRG update controller 230 of FIG. 4.

FIG. 6 is a chart illustrating five iterations of the arbitration technique of embodiments of the present invention, for a particular sequence of asserted requests. In this example, it is assumed that there are only three master devices connected to the arbitration circuitry, namely master devices M0, M1 and M2. In a first iteration of the arbitration process, it is assumed that both master 0 and master 1 are asserting valid requests with a priority level of 3, whilst master 2 is asserting a valid request with priority level of 1. In this example, it is assumed that a priority level having a larger value indicates a higher priority, and accordingly master devices 0 and 1 are currently asserting requests at a higher priority level than master 2.

It is assumed that during this first iteration the current LRG list lists master 1 as the least recently granted, master 2 as the next least recently granted, and master 0 as the most recently granted. The highest active priority level is determined to be priority level 3, as a result of which it is then determined that the group of masters using the highest active priority level are masters 0 and 1. The LRG evaluation circuitry 220 will then determine with reference to the LRG list that master 1 is the least recently granted from among the group of masters 0 and 1, and accordingly the winning request will be the request asserted by master 1. In addition, the LRG list will be updated so that it now identifies master 2 as the least recently granted, master 0 as the next least recently granted, and master 1 as the most recently granted.

In the example illustrated in FIG. 6, it is assumed that any master will continue to assert its request until its request is selected as the winning request. Hence, in the second iteration, master 0 and master 2 continue to assert their previously asserted requests, and in this example it is assumed that master 1 asserts a new request also having a priority level of 3. As shown in FIG. 6, this time around, master 0 is chosen as the winning request because it was the least recently granted from amongst masters 0 and 1. Master 0 is then demoted to the bottom of the LRG list.

The third iteration illustrates a scenario where only one master (M1) is asserting a request at the highest priority level, and accordingly wins irrespective of its position within the LRG group. However, on winning, it will always be placed at the bottom of the LRG group, as shown in FIG. 6.

In the fourth iteration, master 2, that has continued to assert its request at a priority level of 1, now has its asserted request granted due to the fact that there are no other requests asserted at a higher priority level, and master 1 is more recently granted than master 2.

The fifth iteration illustrates how a master at the bottom of the LRG list may still win the arbitration provided its transfer is asserted at the highest priority level. In this example, it is assumed that master 2 employs a dynamic prioritization mechanism for its transfers, and at the time of the fifth iteration is now asserting a request with a priority level of 5. This causes master 2's request to win even though master 2 is at the bottom of the LRG list. At the end of the fifth iteration the update to the LRG list results in no change, since master 2 was already at the bottom of the LRG list.

Whilst in the above described example, each master only has one entry in the LRG list, in an alternative embodiment a weighted prioritization algorithm can be achieved by giving one or more of the master devices more than entry in the LRG list. Purely by way of illustration, if it is decided that master 1 needs to be given a higher weighting than either master 0 or master 2, then it could be given two entries in the LRG list. Purely by way of example, this may mean that the LRG list at the start of the first iteration reads M1, M2, M1, M0. At the end of the first iteration, the LRG list would then be updated to read M2, M1, M0, M1. As a result, if the requests asserted in the second iteration were as shown in FIG. 6, this would result in M1 again being the winning request, rather than M0 as shown in the example of FIG. 6, with the LRG list then being updated to read M2, M0, M1, M1.

Further, it will be appreciated that in alternative embodiments, whether a weighted algorithm is used or not, the relative priorities attributed between the masters does not need to be determined in accordance with an LRG scheme, but instead any other suitable scheme, such as a round-robin scheme, could be used.

Figure 7:
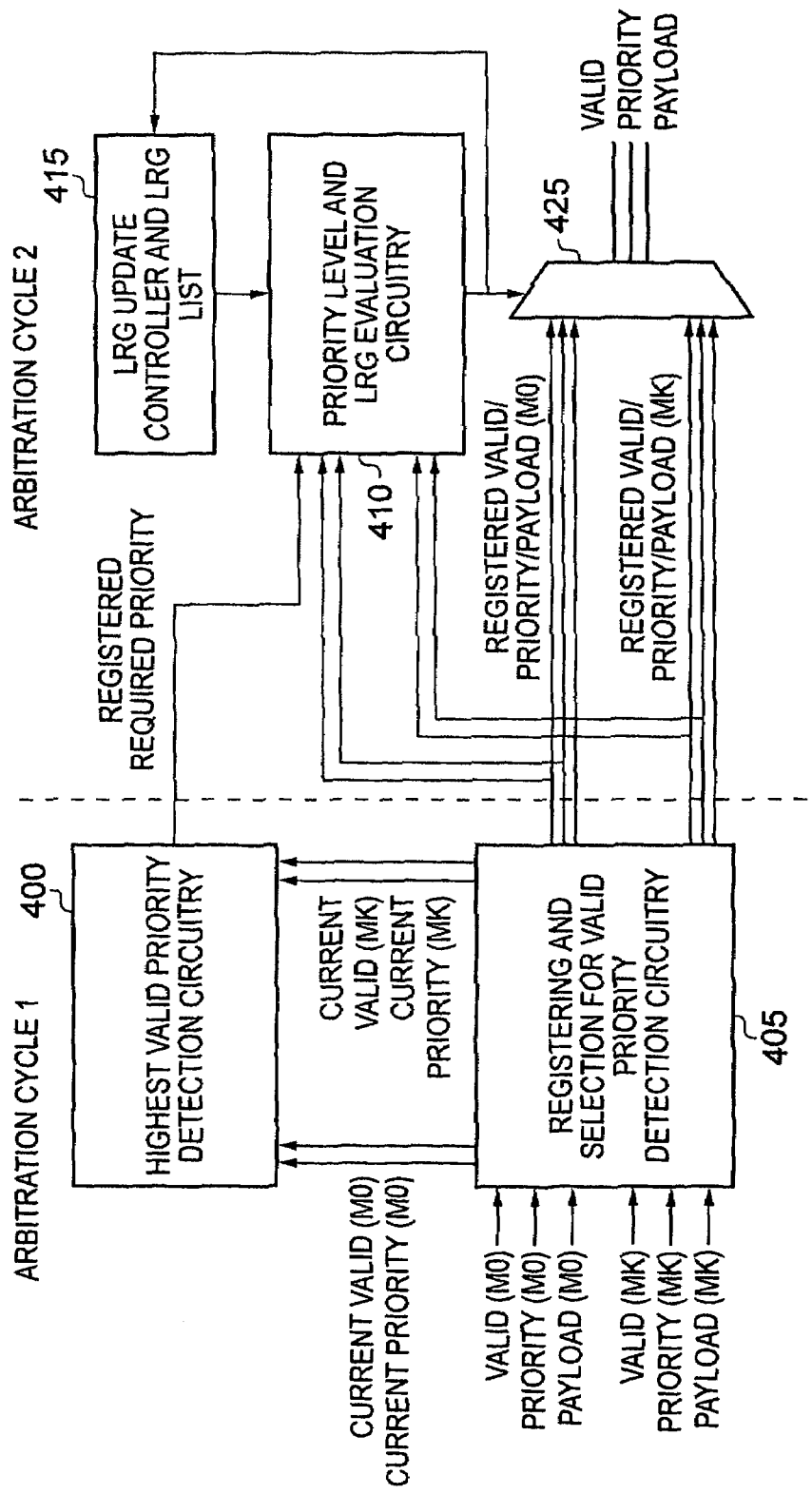
FIG. 7 is a block diagram illustrating arbitration circuitry in accordance with an alternative embodiment.

Each iteration of the arbitration process can in one embodiment be arranged to occur in a single clock cycle. However, it is often the case that arbitration forms a critical path within the data processing system, and the ever increasing clock speeds of modern data processing systems places more and more of a constraint on the timing of the arbitration process. Hence, in an alternative embodiment, the arbitration circuitry of embodiments of the present invention can be arranged in a pipelined manner consisting of at least two pipeline stages. FIG. 7 illustrates one example embodiment where a two stage pipeline is used, such that each iteration of the arbitration process takes two cycles. As shown, the valid, priority and payload signals from each of the masters M0 to Mk are routed to registering and selection circuitry 405, which registers the signals so they can be aligned with the selection of the winning request in cycle 2, and also determines the form of valid and priority signal to be issued to the highest valid priority detection circuitry 400 for each master.

In particular, the registering and selection circuitry includes register slices for each master which are arranged to register the valid, priority and payload signals issued by a particular master. However, the propagation of the valid signal into the register slice is gated by the ready signal returned from the destination. Hence, in the event that a particular register slice already contains valid data, any update to the register slice by newly asserted valid data from the same master is prevented until such time as a set ready signal is received, and a set ready signal for that master will only be received once the transfer already stored in the register slice has been selected as the winning request. Once the data already stored in the register slice has been selected as the winning request, then the ready signal will be set, allowing new valid data to be stored into the register slice.

The registering and selection circuitry 405 then determines, during each arbitration cycle, the current valid and current priority signals to be routed to the highest valid priority detection circuitry 400. The current valid and current priority signals for each master can be viewed as a multiplexed version of the registered signals in the corresponding register slice and the currently asserted signals from the corresponding master. In particular, if there is valid data currently stored in the associated register slice, then it is the priority level stored in the register slice along with the associated valid signal that is routed to the highest valid priority detection circuitry, whereas in the absence of valid data in the register slice, it is the currently asserted valid and priority signals from the master that are routed to the highest valid priority detection circuitry 400.

The highest valid priority detection circuitry 400 determines from the current valid and current priority signals received in respect of each master, what is the highest valid priority level, that highest valid priority level then being registered by the highest valid priority detection circuitry 400.

In the next cycle, the registered priority level value is output to the priority level and LRG evaluation circuitry 410, and the payload, valid and priority signals stored in each register slice are output to the multiplexer 425. The valid and priority signals as output by the circuitry 405 are also routed to the priority level and LRG evaluation circuitry 410. The priority level and LRG evaluation circuitry 410 implements the functionality performed by the valid masking circuitry 215, LRG evaluation circuitry 220 and list order based arbiter 225 of FIG. 4, by identifying those masters currently asserting a valid transfer at the registered required priority level, and from those masters then identifying which of those masters is least recently granted in the LRG list, with that LRG master being selected as the winning request. The multiplexer 425 then operates in the same way as the multiplexer 240 in FIG. 4 to select the valid, priority and payload signals for the winning request, with the winning request indication being returned to the LRG update controller and LRG list circuitry 415, which implements the functionality of the components 230 and 235 of FIG. 4.

As with FIG. 4 there will also be a demultiplexer associated with the ready signal, that demultiplexer being driven by the winning request signal from the circuitry 410. Whilst not shown in FIG. 7, the demultiplexer will operate in exactly the same way as FIG. 4. In one embodiment, there is no need to register the ready signal, but alternatively, if registering of the ready signal is required, this can be achieved by registering, within the relevant register slice of the registering and selection circuitry 405, the ready signal as output by the demultiplexer.

By adopting the two cycle arbitration technique of FIG. 7, this significantly relaxes the timing constraints placed on the arbitration circuitry (by providing tighter timing closure speeds), thereby enabling the arbitration technique to be used in data processing systems operating at high clock speeds.

In one embodiment, due to the way the register slices are updated, a bubble can occur in the pipeline in scenarios where a winning request at a particular priority level is followed in the next arbitration iteration by one or more valid asserted requests none of which have a priority level equal to or higher than that winning request. This is because in the arbitration cycle 1 for iteration 2, arbitration cycle 2 for iteration 1 is being performed, and hence during arbitration cycle 1 for iteration 2, the register slice containing the payload, priority and valid signal for the master that will be chosen as the winning master during arbitration cycle 2 of iteration 1 is still validly stored in the register slice. Accordingly that register slice's valid and priority level values will again be forwarded to the highest valid priority detection circuitry 400 for arbitration cycle 1 of iteration 2. In the scenario identified above, this means that the registered required priority level then output for arbitration cycle 2 of iteration 2 will identify a priority level that none of the active valid asserted requests at that time are using. In this scenario, the priority level and the LRG evaluation circuitry 410 will merely cause the multiplexer to output a valid signal that is not set, thereby causing no data (a bubble) to be passed on in that cycle. This has been found not to be problematic, since it does not affect correct operation of the data processing system, and the occasional occurrence of bubbles is far outweighed by the potential timing benefits achieved from pipelining the arbitration process.

No bubble occurs if, in the next arbitration iteration, at least one of the valid asserted requests is at a priority level equal to or greater than that of the winning request in the previous arbitration iteration.

Through use of the technique of embodiments of the present invention, priority levels can be associated with individual transactions, rather than requiring any fixed correlation between the priority levels and the requester elements issuing the transactions. Hence, the embodiments of the present invention provide a very flexible mechanism for performing arbitration, whilst supporting the setting of priority levels on a transaction-by-transaction basis. This hence enables QoS mechanisms to be associated with one or more of the requester elements to track the service being offered to the requester element and to vary the priority level of its transactions accordingly. One such QoS technique is described in commonly owned, co-pending UK patent application no. 0916200.9, whilst another QoS technique is described in commonly owned, co-pending, U.S. patent application Ser. No 12/073,403, the entire contents of which are hereby incorporated by reference.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   a shared resource;
   a plurality of requester elements sharing access to the shared resource;
   arbitration circuitry, responsive to requests asserted by one or more of said requester elements for access to the shared resource, configured to perform a priority determination operation to select only one of said asserted requests as a winning request, each of the asserted requests having a priority level associated therewith;
   relative priority ordering circuitry for attributing relative priorities to the plurality of requester elements, said arbitration circuitry comprises:
      candidate winner evaluating circuitry, during said priority determination operation, configured to identify every requester element whose asserted request has a priority level not exceeded by any other asserted request; and
      winner selection circuitry, during said priority determination operation, configured to determine the requester element that has the highest relative priority amongst the requester elements identified by the candidate winner evaluating circuitry, and to select as said winning request the request asserted by said determined requester element.

2. A data processing apparatus as claimed in claim 1, wherein said candidate winner evaluating circuitry is arranged to identify a highest priority level associated with the asserted requests, and to determine a requester group containing every requester element from the plurality of requester elements whose asserted request has said highest priority level associated therewith.

3. A data processing apparatus as claimed in claim 2, wherein said winner selection circuitry is arranged to determine with reference to the relative priority ordering circuitry which requester element in the determined requester group has the highest relative priority, and to select as the winning request the request asserted by that determined requester element.

4. A data processing apparatus as claimed in claim 1, wherein:
   the relative priorities attributed by the relative priority ordering circuitry are predetermined.

5. A data processing apparatus as claimed in claim 1, wherein:
   said relative priority ordering circuitry is arranged to apply a relative priority ordering operation to attribute the relative priorities to the plurality of requester elements.

6. A data processing apparatus as claimed in claim 5, wherein the relative priority ordering circuitry is responsive to a predetermined event to re-apply the relative priority ordering operation prior to a subsequent performance of the priority determination operation by the arbitration circuitry.

7. A data processing apparatus as claimed in claim 6, wherein the predetermined event is a current performance of the priority determination operation, and the relative priority ordering circuitry re-applies the relative priority ordering operation in respect of at least a subset of the requester elements.

8. A data processing apparatus as claimed in claim 7, wherein the relative priority ordering circuitry re-applies the relative priority ordering operation in respect of all of the requester elements.

9. A data processing apparatus as claimed in claim 5, wherein said relative priority ordering operation is re-applied following each performance of the priority determination operation.

10. A data processing apparatus as claimed in claim 9, wherein the relative priority ordering operation implements a least recently granted scheme, and the arbitration circuitry determines with reference to the relative priority ordering circuitry which requester element is the least recently granted requester element whose asserted request has a priority level not exceeded by any other asserted request.

11. A data processing apparatus as claimed in claim 9, wherein the priority ordering operation implements a round robin scheme.

12. A data processing apparatus as claimed in claim 9, wherein the relative priority ordering operation implements a weighted algorithm.

13. A data processing apparatus as claimed in claim 12, wherein the relative priority ordering operation maintains a list of entries, each entry being populated to identify one of said plurality of requester elements, and the weighted algorithm being implemented by causing at least one of the requester elements to be identified by more than one entry in said list.

14. A data processing apparatus as claimed in claim 1, wherein the arbitration circuitry has a pipelined arrangement consisting of at least two pipeline stages.

15. A data processing apparatus as claimed in claim 1, wherein at least one of the requester elements comprises a master device.

16. A data processing apparatus as claimed in claim 1, wherein at least one of the requester elements comprises a master interface.

17. A data processing apparatus as claimed in claim 16, wherein said master interface is provided by interconnect circuitry connecting one or more master devices with one or more slave devices.

18. A data processing apparatus as claimed in claim 1, wherein the shared resource is a slave device arranged to process transactions initiated by the asserted requests from one or more of said requester elements.

19. A data processing apparatus as claimed in claim 1, wherein the shared resource is a shared connection path over which the asserted requests are to be routed.

20. A data processing apparatus as claimed in claim 1, wherein each asserted request initiates a transaction comprising an address transfer and one or more data transfers.

21. A data processing apparatus as claimed in claim 20, wherein each asserted request forms said address transfer.

22. A method of arbitrating access to a shared resource within a data processing apparatus comprising a plurality of requester elements sharing access to said shared resource, the method comprising the steps of:
   responsive to requests asserted by one or more of said requester elements for access to the shared resource, performing a priority determination operation to select only one of said asserted requests as a winning request, each of the asserted requests having a priority level associated therewith; and attributing relative priorities to the plurality of requester elements, said performing step comprising:
- identifying every requester element whose asserted request has a priority level not exceeded by any other asserted request;
- determining the requester element that has the highest relative priority amongst the requester elements identified by the identifying step; and
- selecting as said winning request the request asserted by said determined requester element.

23. A data processing apparatus comprising:

shared resource means;

a plurality of requester means for sharing access to the shared resource means;

arbitration means, responsive to requests asserted by one or more of said requester means for access to the shared resource means, for performing a priority determination operation to select only one of said asserted requests as a winning request, each of the asserted requests having a priority level associated therewith;

relative priority ordering means for attributing relative priorities to the plurality of requester means, said arbitration means comprises:
- candidate winner evaluating means for identifying, during said priority determination operation, every requester means whose asserted request has a priority level not exceeded by any other asserted request; and
- winner selection means for determining, during said priority determination operation, the requester means that has the highest relative priority amongst the requester means identified by the candidate winner evaluating means, and for selecting as said winning request the request asserted by said determined requester means.

* * * * *